United States Patent [19]

Sheffield et al.

[11] 4,430,600
[45] Feb. 7, 1984

[54] MODULAR LOW ASPECT RATIO-HIGH BETA TORSATRON

[75] Inventors: George V. Sheffield, Hopewell; Harold P. Furth, Princeton, both of N.J.

[73] Assignee: The United States of America as represented by the United States Department of Energy, Washington, D.C.

[21] Appl. No.: 364,276

[22] Filed: Apr. 1, 1982

[51] Int. Cl.³ .......................... H01J 7/24; G21B 1/00
[52] U.S. Cl. ............................... 315/111.71; 315/248; 376/133; 376/142
[58] Field of Search ................. 315/111.71, 248; 376/133, 142

[56] References Cited

U.S. PATENT DOCUMENTS

| | | | |
|---|---|---|---|
| 2,961,557 | 11/1960 | Hubert | 376/133 |
| 3,886,402 | 5/1975 | Furth | 315/111.71 |
| 4,302,284 | 11/1981 | Ohkawa | 376/142 |
| 4,305,783 | 12/1981 | Ohkawa et al. | 376/142 |

OTHER PUBLICATIONS

"The Next Generation Tokamaks" by B. J. Green, pp. 415-430.
Plasma Physics—by Richard Gill, Academic Press 1981.

*Primary Examiner*—Harold Dixon
*Attorney, Agent, or Firm*—Steven M. Rabin; Judson R. Hightower

[57] ABSTRACT

A fusion reactor device in which the toroidal magnetic field and at least a portion of the poloidal magnetic field are provided by a single set of modular coils. The coils are arranged on the surface of a low aspect ratio toroid in planes having the cylindrical coordinate relationship $\phi = \phi_i + kz$ where k is a constant equal to each coil's pitch and $\phi_i$ is the toroidal angle at which the i'th coil intersects the z=0 plane. The device may be described as a modular, high beta torsation whose screw symmetry is pointed along the systems major (z) axis. The toroid defined by the modular coils preferably has a racetrack minor cross section. When vertical field coils and preferably a toroidal plasma current are provided for magnetic field surface closure within the toroid, a vacuum magnetic field of racetrack shaped minor cross section with improved stability and beta valves is obtained.

15 Claims, 21 Drawing Figures

SEMI-STELLARATORS (OPTIONAL) EXTRA REVERSE-CURRENT WINDING TO ASSIST DIVERTER ACTION

SEMI-STELLARATORS

MODULAR COIL,
LIES IN A $\phi = kz$
SURFACE

SEMI-TORSATRON COILS

ELLIPTIC
TOKAMAK

Fig.5

RACETRACK
TOKATRON

$$K = \text{PITCH} = \frac{\Delta\phi}{\Delta z}$$

MODULAR LOW ASPECT RATIO-HIGH BETA TORSATRON

The U.S. Government has rights in this invention pursuant to contract number DE-AC02-76-CH3073 between the U.S. Department of Energy and Princeton University, Plasma Physics Laboratory, Princeton, N.J.

BACKGROUND OF THE INVENTION

This invention relates to the confinement of plasmas by magnetic fields and, more particularly, to a device which in its preferred embodiment is a hybridization of two prior devices commonly known as the tokamak and the torsatron.

The underlying principle of all types of magnetic plasma containment devices is the containment of a hot dense ionized gas away from physical walls for a time sufficient to allow fusion reactions to occur. Devices employed for the containment of plasmas by magnetic fields may have various configurations. One well known type of such devices is the toroidal type which includes the tokamak, stellerator, semi-stellerator and torsatron. Toroidal devices have the advantage of confining the plasma in closed magnetic field lines.

Among all magnetic confinement devices, the tokamak has progressed farthest toward commercial fusion reactor confinement parameters. The stellarator has shown itself to have the same or even greater potential. A number of detailed technical and economic problems beset these devices which have caused them to fall short of requirements. The tokamak has two basic disadvantages: (1) pulsed operation and (2) modest magnetic pressure to plasma pressure ratio (beta). Conventional stellarator and torsatron devices have the advantage of steady-state operation, but share the disadvantage of modest beta value, and introduce the additional disadvantages of difficult disassembly (due to the interlinking of the helical windings) and impaired particle orbits (due to the field assymetries associated with helical windings).

A device which combined the best features of the stellerator or torsatron and the tokamak using modular coils for easy disassembly, provided good confinement of particle orbits and had the ability to operate in a continuous steady-state low-aspect-ratio high-beta mode would constitute a significant advance in magnetic plasma confinement devices.

OBJECTS OF THE INVENTION

Accordingly, it is an object of the invention to provide a magnetic confinement device which uses modular coils.

Another object of the invention is to provide a magnetic confinement device capable of operating in a steady-state low-aspect-ratio mode.

Another object of the invention is to provide a magnetic confinement device capable of operating in a low-aspect-ratio high-beta mode.

A further object of the invention is to provide a magnetic confinement device capable of operating in a steady-state high-beta mode.

It is a still further object to provide a magnetic confinement device using modular coils, having good particle orbit confinement characteristics and having the ability to operate in a steady-state current, low-aspect-ratio high-beta mode.

It is also an object of the invention to provide a device for magnetically confining a toroidally shaped plasma in a steady-state mode using modular coils which are shaped and assembled to lie in separate nonintersecting planes.

SUMMARY OF THE INVENTION

In accordance with the invention there is provided a modular low-aspect-ratio high-beta torsatron in which the screw symmetry of combined toroidal/poloidal field coils is pointed along the system's major (z) axis. In particular, the invention comprises a device for magnetically confining a plasma including a series of distinct electrically conductive coils forming closed loops on the surface of a toroid and located in separate spaced-apart planes i, i=1 . . . n, defined by the cylindrical coordinate relationship: $\phi = \phi_i + kz$. In accordance with one aspect of the invention structure is provided for generating a vertical field parallel to the major (z) axis of the toroid whereby closed magnetic surfaces are formed with a null closer to outer major radius side of the coils than to the inner major radius side of the coils. This increases the transform locally at the outside of the plasma without substantially increasing the average transform. The average transform may be further increased in accordance with another aspect of the invention by providing structure to drive a plasma current in the plasma (as in a tokamak) thereby to increase the average transform of the magnetic field. In accordance with another aspect of the invention, the stability and beta ($\beta$) value of the device may be increased by shaping each of the conductive coils with elongated side portions having substantially constant radial coordinates and substantially shorter radial portions connecting the side portion to form continuous racetrack-shaped loops.

BRIEF DESCRIPTION OF THE DRAWINGS

These and other features and advantages of the invention will best be understood from the following description of the preferred embodiment of the invention when read in connection with the accompanying drawings in which:

FIG. 10 illustrates a single coil frame of the embodiment illustrated in FIG. 8;

DETAILED DESCRIPTION OF THE PREFERRED EMBODIMENT

A. Theoretical Basis of the Invention

Figure 1A:
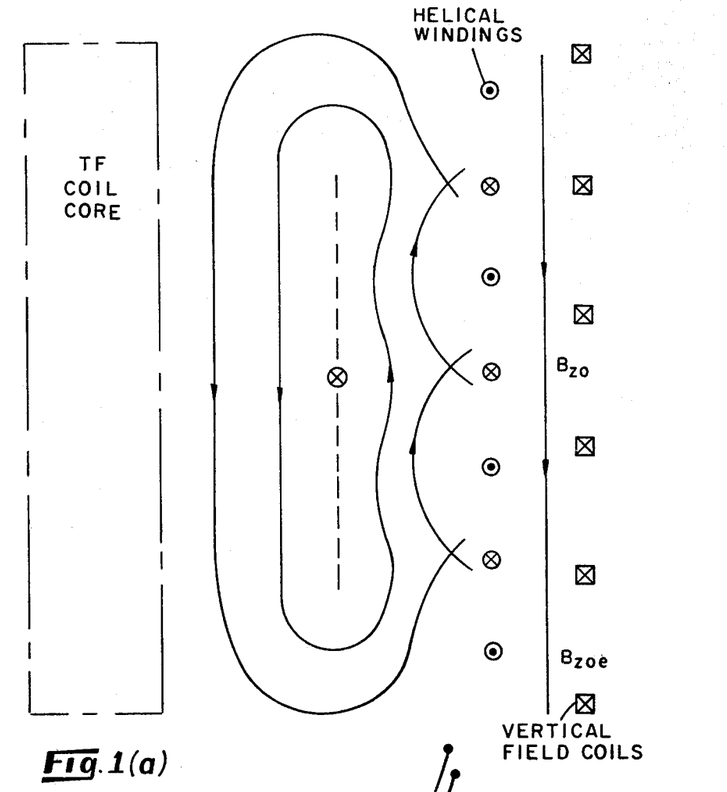
FIG. 1(a) is a schematic representation of the minor cross section of the magnetic field flux surfaces of a semi-stellerator.
Figure 1B:
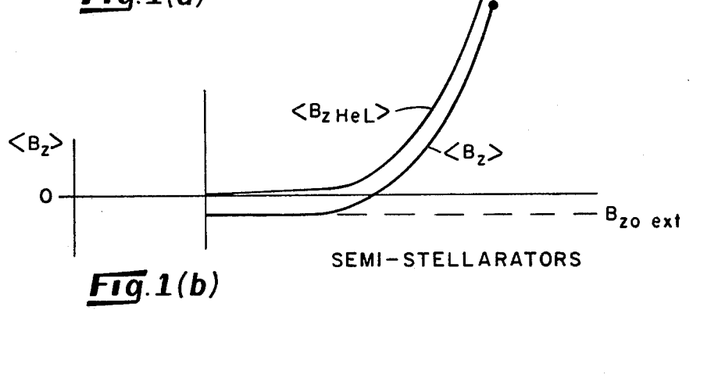
FIG. 1(b) is a graph of the vertical field $B_z$ obtained from the external vertical field $B_{zoe}$ generated by the vertical field coils illustrated in FIG. 1(a) and the vertical field generated by the helical coils of the semi-stellerator also represented in FIG. 1(a)

Of the stellerator type confinement devices known today, the most fundamental geometries are provided by the conventional stellerator which has minor axially directed ($\phi$) screw symmetry and the semi-stellerator which has major axially-directed (z) screw symmetry. These geometries are described by H. P. Furth and C. W. Hartman in Physics of Fluids 11 (1968) 408. Both have perfect helical symmetry and therefore ideal magnetic surfaces and particle orbits in the limit of infinite extent along the major axis. In order to provide finite plasma confinement geometrics, the symmetry must be spoiled at least slightly: in the case of the stellerator, by bending it into a toroid, and in the case of the semi-stellerator, by connecting the inner and outer poloidal surfaces together as by the use of vertical field coils as illustrated in FIGS. 1(a) and 1(b).

The effect of the spoiled symmetry on flux and particle surfaces need not be very damaging, provided spoiling of symmetry is accomplished somewhat gently. Conventional stellerators with aspect ratios of ten or more have excellent magnetic surfaces.

Short fat semi-stellerators also have excellent magnetic surfaces. In fact, semi-stellerators have better magnetic surfaces than conventional stellerators of the same very low aspect ratio. By restriction of the semi-stellerator windings to the large major radius side, destructive intersection of the outer winding screw symmetry with the reverse screw symmetry of the inner (return) windings is avoided.

Figure 2:
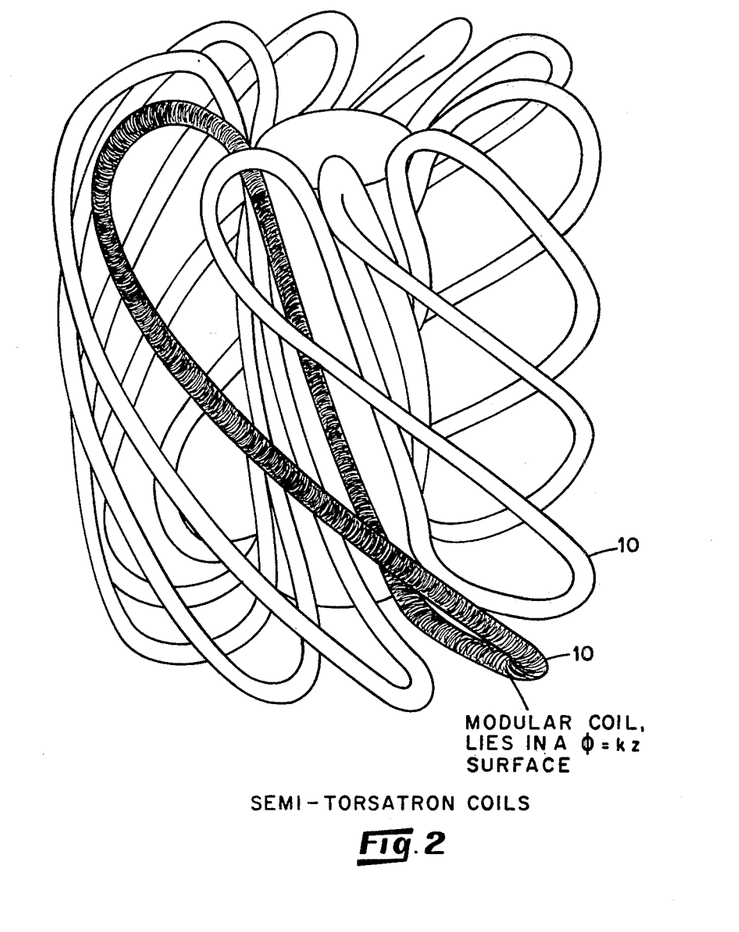
FIG. 2 is a schematic representation of the semi-torsatron coils of the present invention.
Figure 3A:
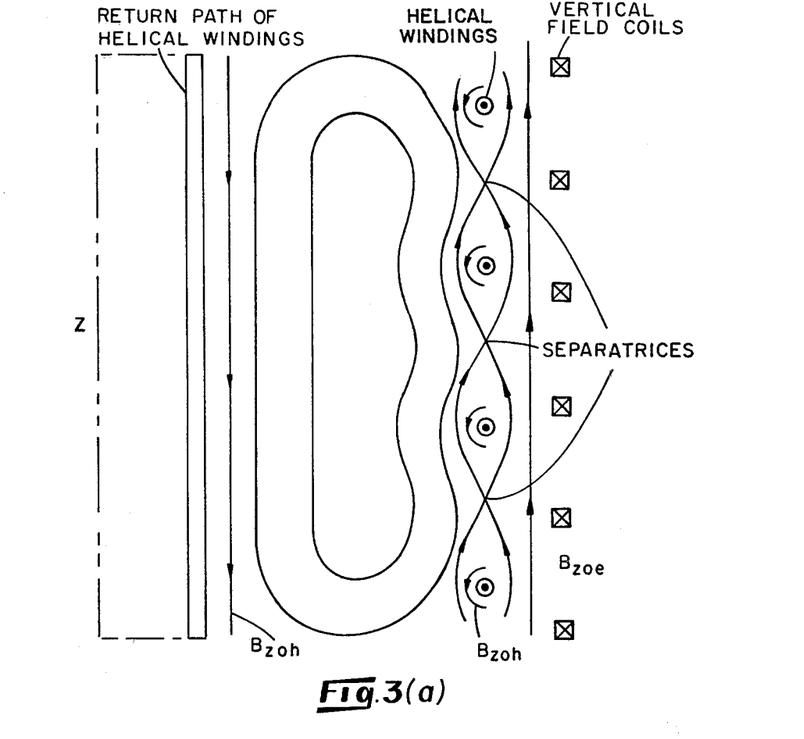
FIG. 3(a) is a schematic representation of the minor cross section of the magnetic field flux surfaces generated by the semi-torsatron coils and vertical field coils of the present invention.
Figure 3B:
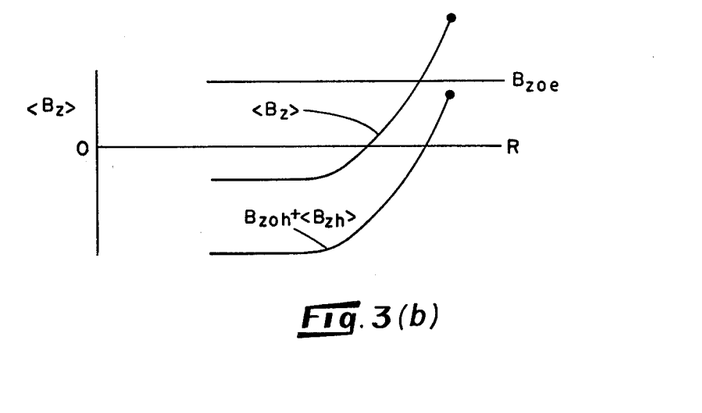
FIG. 3(b) is a graph of the total vertical field $<B_z>$ generated by the sum of the average vertical field $<B_{zh}>$ and global vertical field $B_{zoh}$ generated by the semi-torsatron coils illustrated in FIG. 3(a), and the external vertical field $B_{zoe}$ generated by the vertical field coils illustrated in FIG. 3(a)

It has been found in accordance with this invention that in the low-aspect-ratio limit, a modification of the semi-stellerator which may be called a semi-torsatron with helical symmetry of a vertically (z) directed screw rather than a toroidally ($\phi$) directed screw, i.e., leaving out every other helical winding of the semi-stellerator and completing the circuit of the remaining windings through the bore of the plasma toroid so that the helical windings serve also to generate the basic toroidal field $B_{\phi o}$, also has excellent magnetic surfaces and potentially high beta. In this way the complexity of the coil system is greatly reduced. The coil system is also easy to disassemble, each coil lying on a helical surface $S(r, \phi - kz) = $ constant, e.g., $\phi = kz$. As is illustrated in FIG. 2, each coil can be unscrewed through the top (or bottom) of the coil system. The conditions for field-configuration symmetry and for modular-coil removability are therefore identical. An external vertical field coil system is, of course, still needed as in any torsatron, to opposed the axisymmetric vertical field produced by the toroidal current component of the helical windings, thereby to increase the outer major radius field transform and decrease the inner major radius transform. As is illustrated in FIGS. 3(a) and 3(b), the large major radius sides of the semi-torsatron coils are sufficiently well separated from each other as to act like a conventional helical winding, generating an average vertical field $<B_{zh}>$ that becomes strong near the windings. In addition, the tiltedness of the coils give rise to a vertical field $B_{zoh}$. To produce the closed magnetic surfaces, an externally generated field $B_{zoe}$, opposing $B_{zoh}$, is superimposed.

The exact magnitude and radial variation of $B_{zoe}$ can be used to control the location and shape of the resultant closed surfaces. As illustrated in FIGS. 3(a) and 3(b), such coils provide closed magnetic surfaces having an increased localized transform at the outer portions (large major radius side) of the toroid. An overall increase in transform can be provided by a tokamak plasma current. The semi-torsatron coils and vertical coils can be used for vacuum field confinement with a limiting beta value competitive with that of a conventional tokamak. However, by adding the tokamak plasma current, thus obtaining a tokamak-torsatron hybridization of the present invention (tokatron), much greater beta values may be obtained as will be further described below.

Figure 4:
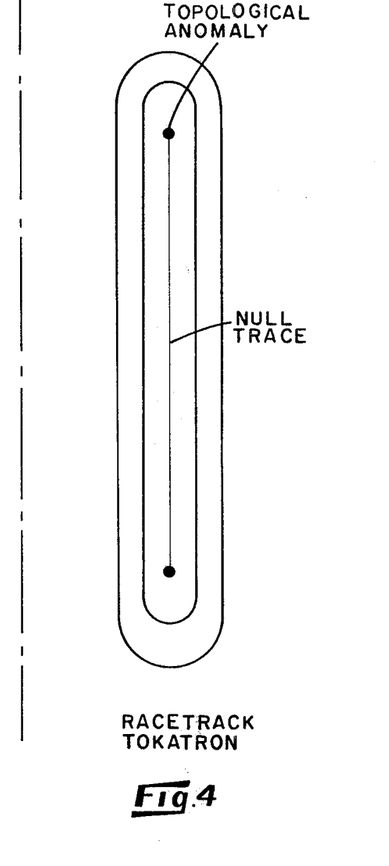
FIG. 4 is a schematic illustration of an idealized minor cross section of the flux surfaces of a tokatron in accordance with the present invention.
Figure 5:
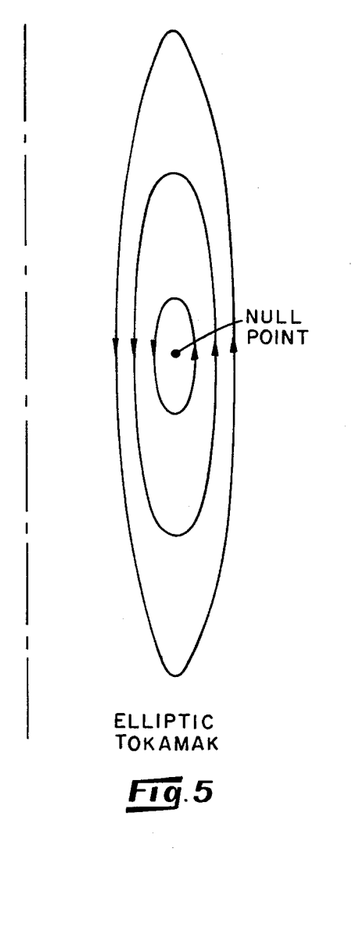
FIG. 5 is a schematic diagram of a minor cross section of the magnetic flux surfaces generated by an idealized vertically elongated tokamak.

The potential for high-beta may be met by proper choice of plasma cross section. It has been found experimentally that (1) flux surfaces having elongated "racetrack-shaped" cross sections with their characteristic extended null traces (as illustrated in FIG. 4) have superior high-beta properties, and (2) vertically elongated coils in the $\phi = \phi_i + kz$ planes produce racetrack-shaped cross sections. The semi-torsatron coils exhibit a strong minimum average B properly which results from the outward shift of the inner flux surfaces. These results contrast with the known fact that in conventional axisymmetric tokamak fields, a high degree of elongation does not help to maximize beta and even a moderate elongation entails vertical instability. The poor stability properties of conventionally elongated tokamaks are associated with an inherent ellipticity of the flux surfaces (as illustrated in FIG. 5) which persists even in the limit of very high elongation, never going over into the desirable "racetrack" cross section with extended null trace.

For a high degree of vertical elongation, the connection between the stable inner and relatively unstable outer plasma surfaces becomes too great to control ballooning and one must look to local high-shear stabilization for achievement of finite beta stability. Fortunately, the shear on the outer surfaces is high in the hybrid device in which a tokamak plasma current is provided.

Figure 6:
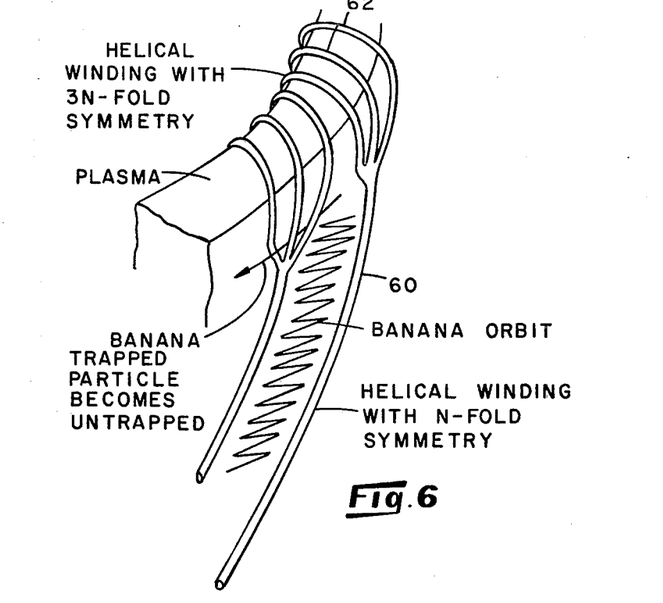
FIG. 6 is a schematic illustration of an alternate embodiment of vertically elongated semi-torsatron coils in accordance with the present invention.

In practical application, the degree of desirable vertical elongation of the semi-torsatron is constrained by asymmetries introduced by the coil radial cross over portions at the top and bottom of the coils. In the vertically central portion of the toroid defined by the semi-torsatron coils, flux surfaces on the large major radius side have flux surfaces of the form $R = R_o + \epsilon \cos(\phi - kz)$. When such a surface is mapped by field lines passing out through the $z > 0$ side, around the minor peripheral and back to the $z < 0$ side of this central region, there can be a destructive interference, leading to island formation and eventually to outward spiraling of the field lines. In order to avoid this, it is desirable to map the scalloped surface into a surface of nearly circular cross section beneath the uppermost and lower regions of the toroid. One means of approaching this ideal is to provide for the filaments of individual coils to fan out at the transition between the vertical and radial portions of the coil as is illustrated in FIG. 6. This approach, which is similar in effect to that of the circularizer described by G. Sheffield in Princeton Plasma Physics Laboratory Annual Report for 1968, Matt-Q-26, p. 215, succeeds in providing well formed magnetic surfaces.

Figure 7A:
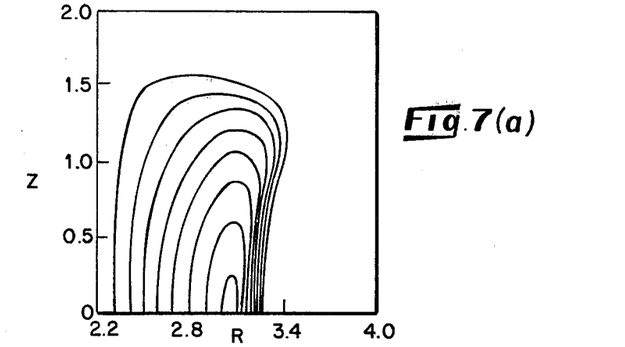
FIG. 7(a) illustrates the magnetic flux surfaces under a coil of a six-coil semi-torsatron in accordance with the present invention.
Figure 7B:
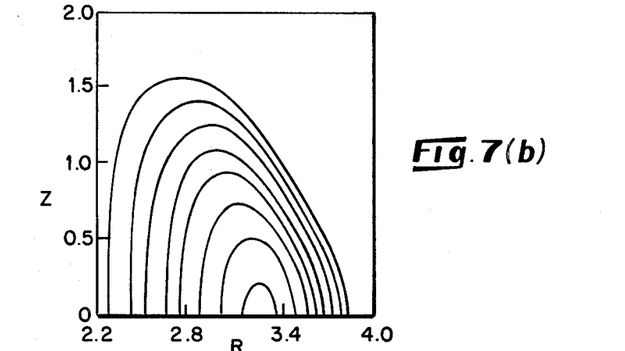
FIG. 7(b) illustrates the magnetic flux surfaces between semi-torsatron coils in accordance with the present invention.
Figure 7C:
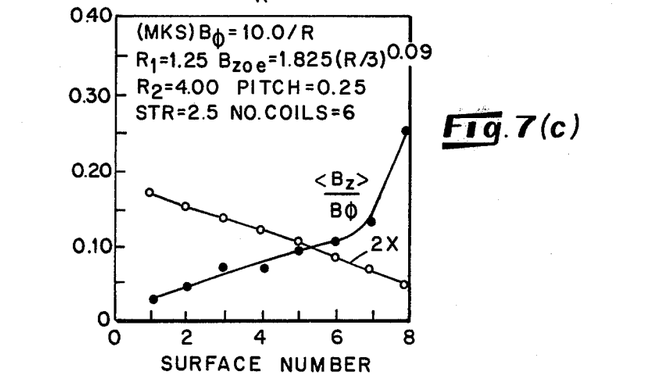
FIG. 7(c) is a graph of the normalized rotational transform $\iota$ and the vertical to toroidal magnetic field ratio on the large major radius side of a six-coil semi-torsatron as a function of flux surface number.
Figure 7D:
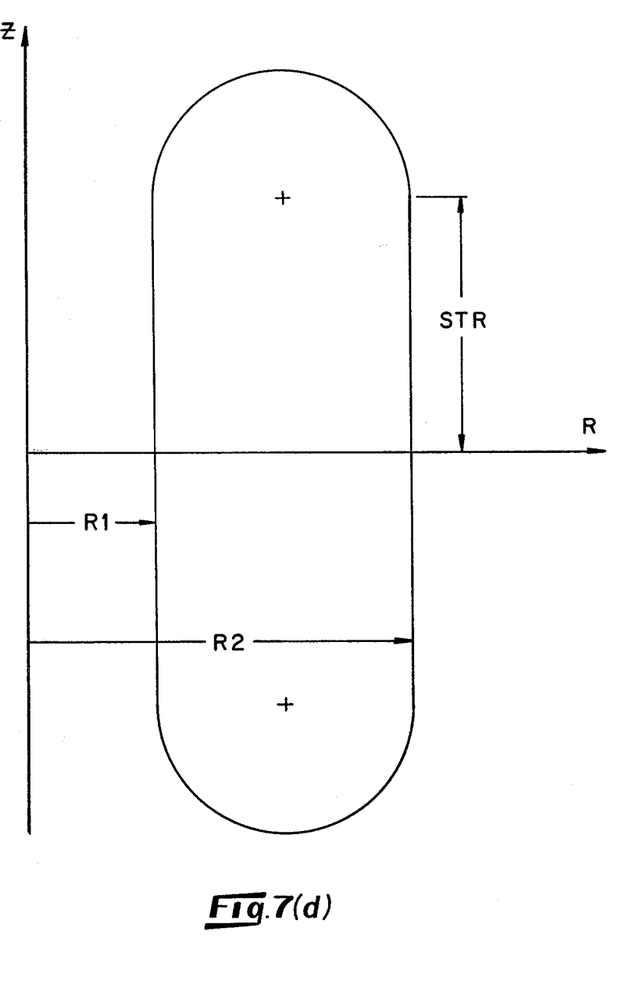

FIGS. 7(a), 7(b) and 7(c) illustrate a semi-torsatron field modeled by a computer simulation of six coils lying in $\phi = \phi_i + kz$ planes with modest vertical elongation. FIG. 7(d) is a perspective view of a single coil. The chosen geometric parameters of each coil are as follows: small major radius $R_1 = 1.25$ m, large major radius $R_2 = 4$ meters, pitch k=0.25 radians/meter and vertical elongation STR=2.5 meters. The total current in the semi-torsatron coils was $5 \times 10^7$ ampere-turns and the external vertical field was given by the equation $B_{zo\text{-}e} = 1.825(R/3)^{0.09}$. While these parameters are known by the inventors to constitute a practical, workable embodiment, they are not known to be optimum with the possible exception of the pitch. The chosen values of $R_2$ and k cause the outboard leg of the semi-torsatron coil to make a 45-degree angle with the midplane. This is near optimum.

FIG. 7(a) shows the flux surfaces beneath a coil; FIG. 7(b) illustrates the flux surfaces between two coils; FIG. 7(c) is a graph as a function of flux surface number of the normalized rotational transform $\iota$ and the ratio $<B_z>/B_\phi$ on the large major radius side of the coil. The average vertical field on the large major radius side is substantial ($<B_z> \sim 0.25 B_{100}$), while the central rotational transform $\iota$ remains small [$\iota(o) \sim 0.17$].

The degree of approximation to ideal semi-torsatron symmetry and therefore potentially higher beta may be improved in a semi-torsatron-tokamak hybrid, to be known as the "tokatron," by introducing an additional vertical field contribution, $B_{zoc}$, generated by a tokamak plasma-current layer. For purposes of this hybridization, the above-described high average vertical field on the large major radius side of the semi-torsatron and the semi-torsatron's small central rotational transform $\iota$ are both favorable features. They are favorable features because a large $<B_z>$ is needed to improve ballooning-mode stability at high beta, while a low vacuum-field contribution $\iota_h$ leaves room within the Kruskal-Shafranov limit ($\iota = \iota_h + \iota_c < 1$) for a substantial tokamak-current contribution $\iota_c$. Some of the theoretical and computer proven advantages of the semi-torsatron and tokatron are described in greater detail in a report, PPPL 1827 (August 1981), authored by the inventors of this application and published by Princeton University Plasma Physics Laboratory, Princeton, N.J.

B. Exemplary Embodiments of the Invention

Figure 8:
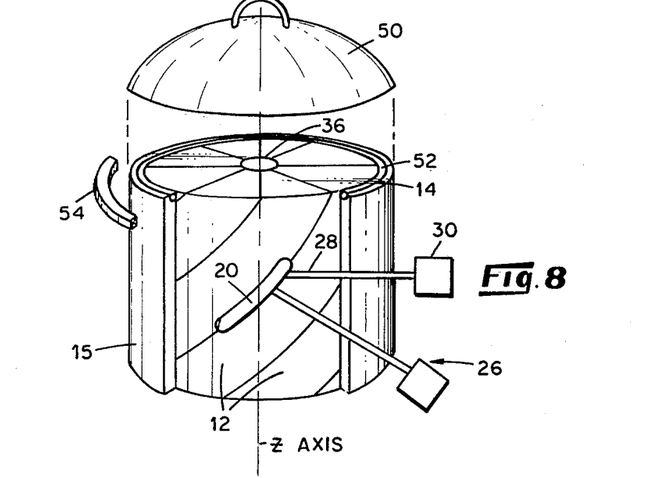
FIG. 8 is a schematic illustration of a tokatron with portions removed, in accordance with the present invention.
Figure 9:
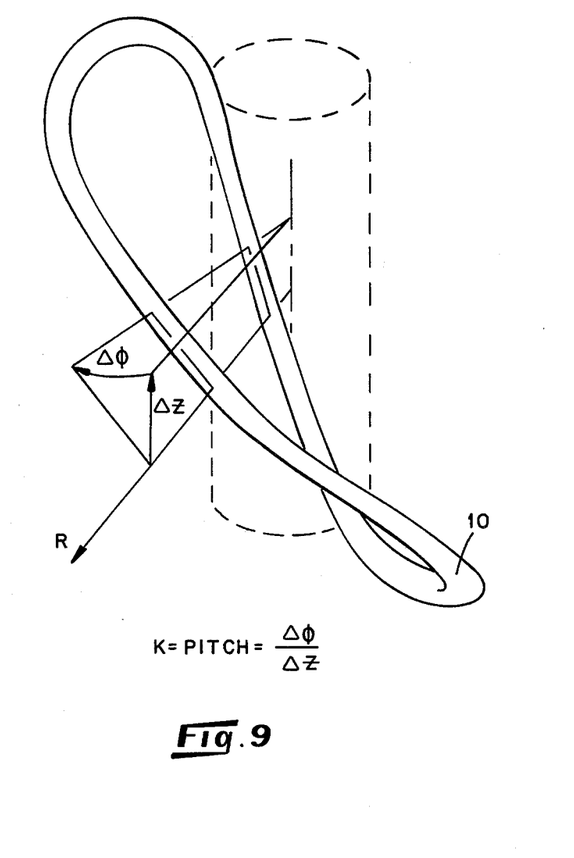
FIG. 9 is a schematic illustration of a single semi-torsatron coil in accordance with the present invention.
Figure 11:
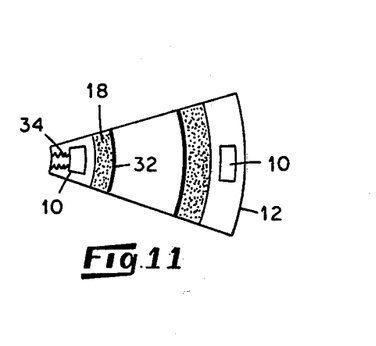
FIG. 11 is a cross sectional view of the coil frame illustrated in FIG. 10.

A preferred embodiment of the invention is schematically illustrated in FIGS. 2 and 8-11. The semi-torsatron coils which generate the toroidal field $B_{100}$, the average vertical field $<B_{zh}>$ and the global vertical field $B_{zoh}$ fields, which are described above with respect to FIGS. 3(a) and 3(b), each lies substantially in a separate spaced-apart plane $\phi = \phi_i + kz$. The geometry of each individual coil is best illustrated in FIG. 9 and its relation to the remaining coils is illustrated in FIG. 2. Each coil 10 is suitably embedded in a separate sturdy helical frame 12 as is illustrated in FIGS. 10 and 11. Each coil 10 may be composed of a superconducting material in which case a Dewar would be provided. In addition to the coil, the frame 12 would also be provided with a neutron shield and local blanket 18.

Referring to FIG. 8, each frame 12 is keyed into helical tracks 14 in a cylindrical outer supporting collar 16 which is closed at its bottom. Between the helical coil frames 12, there is a great deal of space for windows 20 to permit particle or RF beam injection from an appropriate source 26 or plasma outflow through a diverter channel 28 that might be created at a helical separatrix between coils, leading to a separate diverter dump chamber 30.

The tokatron geometry provides a very convenient way of replacing the reactor "first wall." As shown in FIG. 11, it is possible to set a sacrificial liner 32 into each coil. These liners then form a surface of evolution about the z axis. To remove a liner 32, the corresponding coil frame 12 is raised out of the device and the liner is slid in the toroidal direction. The shielding and blanket sections 18 can be replaced in the same manner.

The helical coil frames 12 during operation of the reactor experience the usual toroidal reactor centering forces, which, however, are partly taken up by internal stresses within each frame, depending on the degree of helicity. There is no need to save room at the major axis portion of the device for a large ohmic heating primary winding as in the conventional tokamak since the tokamak current drive, if it is used at all, can be applied slowly to an initial plasma that is confined by the semi-torsatron vacuum fields as by a long pulse ohmic heating transformer inductor. Alternatively, the tokamak current drive can be applied by a small short pulse transformer inductor and maintained by a neutral beam or RF device. Therefore, there is room for massive coil noses 34 pressing on a center post 36. Such noses should provide support to superconducting windings against the centering force, without excessive heat loss.

The vacuum enclosure is provided by the mechanical support collar 16, plus a lid 50 at the top. Lid 50 is vacuum sealed to the support collar by an "O" ring 52 which is well shielded from the plasma as well as from neutrons. Outside the support collar 16 are vertical field coils 54, placed so as not to interfere with the lifting of the lid or the coil frames. Conventional current supplies may be utilized to provide current to the vertical field coil 54 and the semi-torsatron coils 10.

Figure 12:
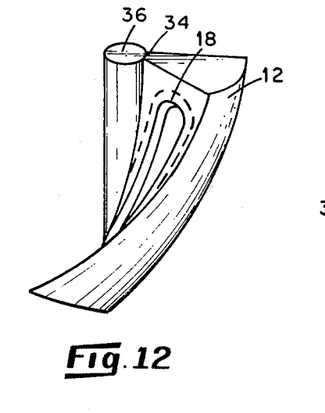
FIG. 12 is a schematical illustration of a second embodiment of a semi-torsatron in accordance with the present invention.
Figure 13:
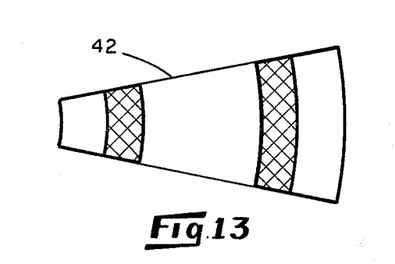
FIG. 13 is a cross sectional view of a removable spacer case shown in FIG. 12.
Figure 14:
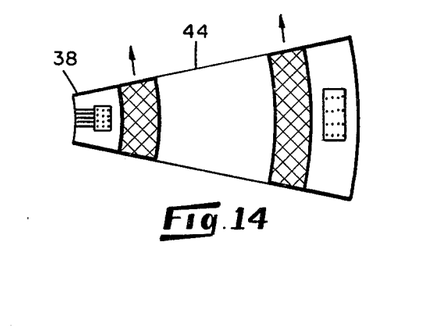
FIG. 14 is a cross sectional view of a fixed coil case shown in FIG. 12.

In an alternative embodiment, which is illustrated in FIGS. 12, 13 and 14, the coil containing frames 44 are left permanently in place, with their cold noises 38 pressing directly on the cold centering post 40. Removable sectors 42 between the fixed coil frames 44 can be lifted out of the device by means of the same toroidally directed displacement as in the case of the first embodiment illustrated in FIGS. 8–11. The blanket and shield elements can then be extracted from them as well as from the stationary coil frames 44. The toroidal field exerts a torque at the top and bottom of each coil tending to make the coil "stand up," but this torque is partly absorbed as an internal stress in each helical frame 44 and is easily overcome by keying into the massive support collar (not illustrated in FIG. 12).

The tokatron reactor of the present invention has the attractive feature that there are no delicate mechanisms of any kind exposed to the plasma; only the massive helical coil units 10 inside their individual vacuum tight cases 12 are so exposed. If the heating and/or current driving means includes a neutral beam injector it could be set well back and aimed conveniently through access window 20 as illustrated in FIG. 8. On the other hand, the helical geometry of the tokatron may be fit to simple wave guides for RF heating and current driving.

Figure 15:
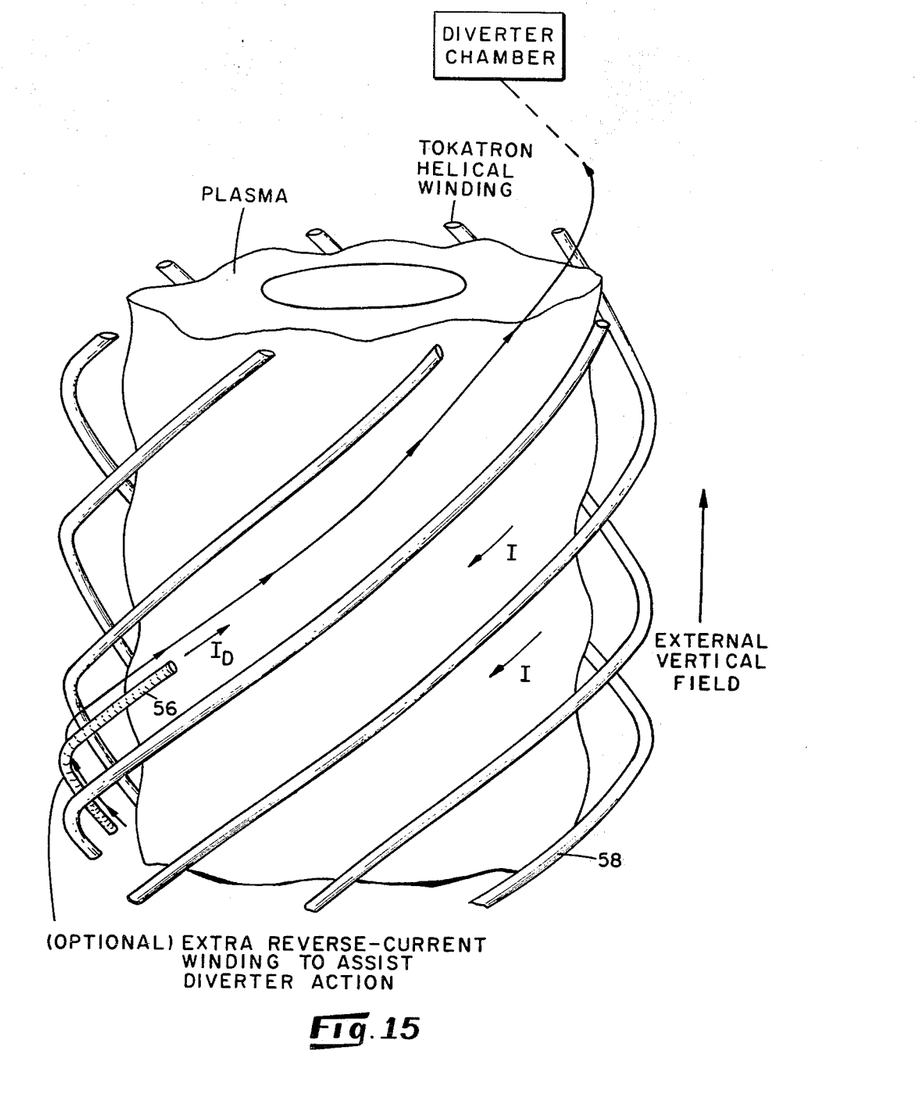
FIG. 15 is a schematic illustration of a third embodiment of the semi-torsatron in accordance with the present invention which includes an extra reverse-winding to assist diverter action.

In addition to the diverter described above and schematically illustrated in FIG. 8, the tokatron has many other possibilities for attaching a diverter. For example, a poloidal diverter separatrix tends to form at the top and bottom of a racetrack-shaped magnetic field flux surface cross section which, as described above, would be obtained from the present coil configuration. However, perhaps the most advantageous diverter is located between the coils as illustrated in FIG. 8. There, a natural diverter is created by means of a helical separatrix between the coils, as illustrated in FIG. 3(a). Location of the diverter at the helical separatrix has the advantages that (1) the basic symmetry is not spoiled by the diverter, and (2) the separatrix is a helical field line that merges with the external and vertical field at the top and bottom of the coil configuration and can lead to a separate diverter dump chamber. Formation of a suitable helical separatrix can be encouraged, if necessary, by a special reverse-current winding 56 between a pair of regular semi-torsatron coils 58 as is illustrated in FIG. 15.

Figure 16:
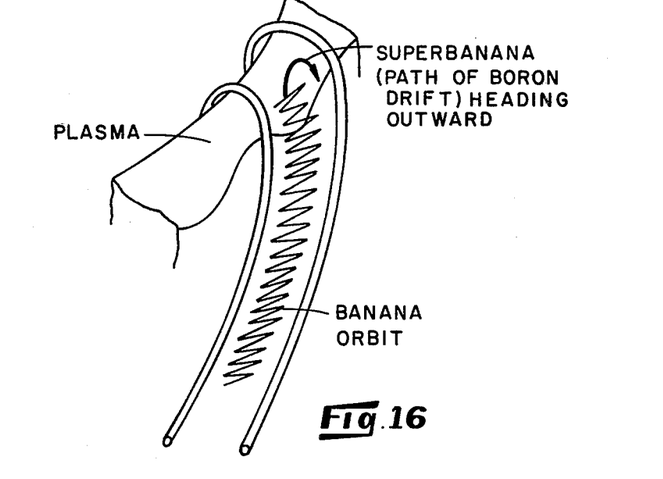
FIG. 16 is a schematic drawing of a portion of a vertically elongated pair of semi-torsatron coils illustrating the superbanana particle orbits which may occur in the absence of the modifications illustrated in FIG. 6.

In accordance with another embodiment of the invention, the coils illustrated in FIG. 9 are modified at the upper and lower extremities thereof as is illustrated in FIG. 6. In this embodiment, which is discussed above and is particularly useful in tokatrons having a high vertical elongation, helical coils 60 which are suitably composed of conductive filaments, fan out into $\phi = kz$ type planes on opposite sides of the principle plane of the coil 60. The fanned-out coil filaments 62 have a beneficial effect on particle orbits at the upper and lower extremeties of the reactor. In particular, a particle trapped in a banana orbit between two vertically elongated helical windings of the first embodiment illustrated in FIG. 2 will drift along the helical symmetry coordinates until it encounters symmetry-spoiling end-effects, and will then be launched into a superbanana excursion as illustrated in FIG. 16. In the embodiment illustrated in FIG. 6, however, the fanned-out coil 62 approximate axisymmetry and in that way, the particle trapped between helical conductors will tend to become untrapped before it drifts into a region of substantially different field strength, and thus will not be launched into a major superbanana orbit.

In accordance with another embodiment of the invention, a small region of reverse transform in the immediate vicinity of the inner portion of the windings can be suppressed by smoothing out the current distribution of the small major radius side of the coil.

In order to be of practical value as a fusion power research device, the coils and plasma generating current should be capable of generating a magnetic field of at least 2 Tesla, the plasma current should be capable of reaching 500 kA and the minor radius should be at least 40 cm. Larger devices would probably be required for a commercial electric power generating application.

Although only a few preferred embodiments of the invention are disclosed in detail above, for illustrative purposes, it will be understood that variations and modifications of the disclosure which lie within the scope of the pending claims are fully contemplated.

We claim:

1. A device for magnetically confining a plasma, comprising;
   semi-torsatron coil means, including a plurality, n in number, of electrically conductive coils, for generating a first toroidal field and a first poloidal field within said toroid, said plurality of coils forming closed loops in separate spaced-apart planes i, i = 1 ... n, n being a positive integer greater than 2;
   each of said plurality of coils surrounding and lying on the boundary of said toroid, said toroid having a major axis, and a minor axis encircling said major axis lying in the equatorial midplane perpendicular to said major axis;
   the cylindrical coordinates of every point $(r,\phi,z)$ in each of said planes having a relationship $\phi = \phi_i + kz$ where z is measured along said major axis, $\phi$ is an angle measured along said minor axis, k is a constant and $\phi_i$ is the value of $\phi$ in the i'th plane at z equal to zero.

2. A device as in claim 1, further comprising vertical field means for generating a second magnetic field in said plasma parallel said major axis whereby said vertical field means and said semi-torsatron coil means combine to generate in said toroid a net poloidal field having closed magnetic surfaces and a null closer to the portion of the said plurality of coils furthest from said major axis than to that portion of said plurality of coils closest to said major axis.

3. A device as in claim 1 wherein said semi-torsatron coil means comprises means for driving a current through said plurality of coils in a same generally poloidal direction relative to said minor axis.

4. A device as in claim 1 wherein each of said plurality of coils comprise two opposing side portions having substantially constant radial coordinates along their lengths and two spaced-apart substantially radially extending portions connecting said side portions to form a continuous loop.

5. A device as in claim 4 wherein said side portions are substantially longer than said radially extending portions.

6. A device as in claim 1 wherein each of said plurality of coils comprises first and second opposing side portions, located respectively inside and outside said minor axis and two spaced-apart portions extending in a generally radial direction connecting said side portions to form a continuous loop, each generally radially extending portion comprising a plurality of coextensive elongated conductor elements connected at opposite ends to said side portions, said coextensive elongated conductor elements fanning out perpendicularly to said radial direction.

7. A device as in claim 4 wherein said spaced-apart portions each comprise a plurality of coextensive elongated conductor elements which fan out in directions of increasing and decreasing $\phi$.

8. A device as in claim 1 further comprising a vacuum vessel for retaining said plasma therein and for excluding atmospheric gases.

9. A device as in claim 3 wherein said current driving means comprises means for generating an electrical current sufficient to create a toroidal field in said plasma of at least 2 Tesla.

10. A device as in claim 3 or claim 9 further comprising means for generating a plasma electrical current in said plasma, said plasma electric current having a magnitude of at least 500 kA.

11. A device as in claim 1 having a minor radius of at least 40 cm.

12. A device as in claim 1 where n is at least 4.

13. A device as in claim 1 wherein n=6.

14. A device as in claim 1 wherein each of said plurality of coils intersects said equatorial midplane at an angle of approximately 45 degrees.

15. A device for magnetically confining a plasma, comprising;

semi-torsatron coil means, including a plurality, n in number, of vertically elongated electrically conductive coils, for generating a first toroidal field and a first poloidal field within said toroid, said plurality of coils forming closed loops in separate spaced-apart planes i, i=1 . . . n, n being a positive integer greater than 2;

each of said plurality of coils surrounding and lying on the boundary of said toroid, said toroid having a major axis, and minor axis encircling said major axis lying in the equatorial midplane perpendicular to said major axis;

the cylindrical coordinates of every point (r,$\phi$,z) in each of said planes having a relationship $\phi=\phi_i+kz$ where z is measured along said major axis, $\phi$ is an angle measured along said minor axis, k is a constant and $\phi_i$ is the value of $\phi$ in the i'th plane at z equal to zero; and vertical field means for generating a second magnetic field in said plasma parallel said major axis whereby said vertical field means and said semi-torsatron coil means combine to generate in said toroid a composite magnetic field having magnetic flux surfaces which appear generally racetrack-shaped in planes perpendicular to said equatorial plane.

* * * * *